2,716,107
SYNTHETIC RUBBER EMULSION POLYMERIZATIONS IN THE PRESENCE OF AN ALDEHYDE OR KETONE SULFOXYLATE

Robert W. Brown, Naugatuck, Conn., assignor to United States Rubber Company, New York, N. Y., a corporation of New Jersey No Drawing. Application March 30, 1953,
Serial No. 345,669

16 Claims. (Cl. 260—84.1)

This invention relates to improvements in activated organic peroxide catalyzed synthetic rubber emulsion polymerizations.

Increasing the reaction rate of organic peroxide catalyzed synthetic rubber emulsion polymerizations by means of a ferrous salt is known. Ferrous sulfate and alkali pyrophosphate have been used in commercial GR-S (butadienestyrene) polymerizations as activators for the peroxide catalyst, and in so-called regenerated recipes a reducing sugar has been additionally included to continually regenerate the ferrous ions. Such ferrous pyrophosphate-sugar recipes must be aged at carefully regulated temperatures to bring the activator to the optimum activity. It is known to add an alkali salt of ethylenediamine tetraacetic acid to increase the rate of conversion of synthetic rubber-forming monomers to polymer in these ferrous pyrophosphate-sugar activated organic peroxide catalyzed synthetic rubber emulsion polymerizations. (Ind. Eng. Chem. 41, 1592–1599.) It is also shown in this article that the alkali salt of ethylenediamine tetraacetic acid without the alkali pyrophosphate and sugar can itself retain the ferrous ion from the ferrous sulfate in soluble or sequestered condition to activate the organic peroxide catalyzed synthetic rubber polymerizations. It is necessary, however, especially in low temperature organic peroxide catalyzed synthetic rubber emulsion polymerizations, to increase the reaction rate of such polymerizations activated by an iron salt and an alkali salt of ethylenediamine tetraacetic acid.

According to the present invention, the reaction rate or organic peroxide catalyzed synthetic rubber aqueous polymerizations activated by an iron salt and an alkali salt of ethylenediamine tetraacetic acid is increased by the addition of a sulfoxylate.

In carrying out the present invention, the synthetic rubber-forming polymerizable monomers are polymerized in an aqueous emulsion in the presence of an organic peroxide catalyst, a water-soluble iron salt, an alkali salt of ethylenediamine tetraacetic acid, and a sulfoxylate, which may be an alkali-metal aldehyde sulfoxylate or an alkali-metal ketone sulfoxylate. The preferred sulfoxylate is sodium formaldehyde sulfoxylate which is readily available in the form of the dihydrous salt ($NaO_2SCH_2OH \cdot 2H_2O$). A convenient preparation of aldehyde sulfoxylates or ketone sulfoxylates is by reacting the selected aldehyde or ketone with sodium dithionite. In these reactions, as illustrated below, one mol of the aldehyde bisulfite or ketone bisulfite is formed for each mol of the aldehyde sulfoxylate or ketone sulfoxylate. Such bisulfites do not interfere with the action of the sulfoxylates in accelerating the polymerization reaction rate, and of themselves do not have any appreciable polymerization accelerating action. The aldehyde sulfoxylates and ketone sulfoxylates may be in the form of their amine condensation products and in this form accelerate the polymerization reaction rate. The aldehyde sulfoxylates and ketone sulfoxylates readily react with compounds containing an amino group having a hydrogen attached to the nitrogen, i. e. primary and secondary amino groups, to give the amine condensation product according to the general reaction:

$$NaO_2SCH_2OH + H-N\begin{matrix}R'\\ \\R\end{matrix} \longrightarrow NaO_2SCH_2-N\begin{matrix}R'\\ \\R\end{matrix} + H_2O$$

where R is a hydrogen, alkyl, acyl or aryl group and where R' is an alkyl or aryl group. The amount of sulfoxylate whether added alone, or with the bisulfite, or as an amine condensation product, will generally be from 0.0002 to 0.02 gram equivalent per 100 grams of polymerizable monomers, e. g. from 0.02 to 2 parts of sodium formaldehyde sulfoxylate per 100 parts of polymerizable monomers.

The catalyst may be a conventional organic peroxide catalyst, for example, cumene hydroperoxide, diisopropylbenzene hydroperoxide, tertiary-butyl isopropylbenzene hydroperoxide, phenylcyclohexane hydroperoxide, paramenthane hydroperoxide, cymene hydroperoxide, etc. The amount of organic peroxide catalyst is that generally used, viz., from 0.02 to 2 parts per 100 parts of polymerizable monomers.

The iron salt may be any water-soluble iron salt, for example, ferrous sulfate or ferric chloride. The amount of iron salt will generally be that equivalent to 0.0002 to 0.02 parts of iron (Fe) per 100 parts of polymerizable monomers, e. g. from 0.0006 to 0.06 part of ferrous sulfate ($FeSO_4$) or ferric chloride ($FeCl_3$) per 100 parts of polymerizable monomers.

The alkali salt of ethylenediamine tetraacetic acid in an alkaline medium is the tetraalkali salt, i. e. tetrasodium, tetrapotassium, or tetraammonium ethylenediamine tetraacetate. In general, the aqueous medium in synthetic rubber emulsion polymerizations is alkaline. The tetraalkali ethylenediamine tetraacetate may be added as the tetraalkali salt to the alkaline emulsion of polymerizable monomers or may be formed by neutralization in situ on the addition of the free ethylene-diamine tetraacetic acid or the mono-, di- or tri-alkali salts of ethylenediamine tetraacetic acid. The amount of alkali salt of ethylenediamine tetraacetic acid will generally be from 0.001 to 0.5 part per 100 parts of polymerizable monomers. Conveniently the amount of alkali salt of ethylenediamine tetraacetic acid may be from one-third to twice the amount of iron (Fe) present, although higher amounts are not objectionable.

As in conventional emulsion polymerization of rubber-forming monomers, the emulsifying agents may be the water-soluble soaps of soap-forming monocarboxylic acids, such as the alkali salts of aliphatic acids having 8 to 24 carbon atoms, rosin acids, or naphthenic acids, or other anionic surface-active emulsifying and dispersing agents. The emulsion of polymerizable monomers which is usually alkaline will generally contain 1 to 10 parts of emulsifying agent per 100 parts of polymerizable monomers. If desired, conventional polymerization regulators, such as aliphatic mercaptans having 6 to 18 carbon atoms ($C_6$ to $C_{18}$), and aromatic mercaptans may be used to regulate the polymer chain length generally in amount from 0.1 to 0.5 part per 100 parts of polymerizable monomers.

The polymerizable material in the preparation of the synthetic rubber latex may be one or a mixture of butadienes-1,3, for example, butadiene-1,3, methyl-2-butadiene-1,3 (isoprene), chloro-2-butadiene-1,3 (chloroprene), piperylene, 2,3-dimethyl butadiene-1,3. The polymerizable material, as is shown, may be a mixture of one or more such butadienes with one or more polymerizable compounds which are capable of forming rubber copolymers with butadienes-1,3; for example, up to 70% of such mixture of one or more compounds which contain a single $CH_2=C<$ group where at least one of the disconnected valences is attached to an electro-negative group, that is, a group which substantially increases the electrical dissymmetry or polar character of the molecule. Examples of such monoolefines containing a terminal methylene ($CH_2=C<$) group which are copolymerizable with butadienes-1,3, are aryl olefins, such as styrene, vinyl naphthylene; alpha methyl styrene, parachloro styrene, dichloro styrene; the alpha methylene carboxylic acids and their esters, nitriles and amides, such as acrylic acid, methyl acrylate, methyl methacrylate, acrylonitrile, methacrylonitrile, methacrylamine; methyl vinyl ether, methyl vinyl ketone; vinylidene chloride; vinyl pyridine.

The present invention is particularly adapted to synthetic rubber polymerizations from 0° F. to 50° F., but may readily be used at higher polymerization temperatures above 50° F. to 150° F. At temperatures from 0° F. to 35° F. an anti-freeze, e. g. methanol, is used to prevent freezing of the polymerization mixture (see Process Problems in Low-Temperature Emulsion Polymerization in Rubber Chem. and Tech., 22, 405–426). After conversion of the desired amount of polymerizable monomers to synthetic rubber, generally about 50% to 85%, or higher, the polymerization may be stopped by the addition of a so-called shortstopping agent which prohibits further polymerization of the monomers during their removal. Di-tert-butyl hydroquinone, alkali dimethyl dithiocarbamates, and dinitrochlorobenzene are common shortstopping agents. After addition of the shortstopping agent, the unreacted residual polymerizable monomers are removed from a synthetic rubber latex, as by venting off monomers, e. g. butadiene-1,3, which are gaseous at atmospheric pressure, and by steam distilling under reduced pressure the residual higher boiling point or liquid monomers, e. g., styrene, and the thus recovered polymerizable monomers may be utilized in subsequent emulsion polymerizations. If desired, the synthetic rubber latex may be coagulated by salt and/or acid in known manner.

The following examples illustrate the invention. All parts and percentages referred to herein are by weight:

Example I

Aqueous emulsions of synthetic rubber-forming monomers were made up according to the following recipe:

| | Parts by weight |
|---|---|
| Butadiene | 70 |
| Styrene | 30 |
| Sodium soap of disproportionated rosin acid | 5 |
| Diisopropylbenzene hydroperoxide | 0.15 |
| $FeCl_3 \cdot 6H_2O$ | 0.015 |
| Tetrasodium salt of ethylene diamine tetraacetic acid | 0.03 |
| Sodium formaldehyde sulfoxylate | Variable |
| Mixed tertiary mercaptans (Ave. $C_{14}$) | 0.25 |
| Potassium chloride (viscosity reducer) | 0.3 |
| Water | 180 |

The 180 parts of water included the water used to make up the water solutions of some of the added reagents, and the water added as such (excess water). The following loading order was used: (1) excess water, (2) water solution of tetrasodium salt of ethylenediamine tetraacetic acid, (3) water solution of $FeCl_3 \cdot 6H_2O$, (4) water solution of soap emulsifier and potassium chloride (viscosity reducer), (5) water solution of sodium formaldehyde sulfoxylate (where added), (6) most of the styrene containing the mercaptan, (7) butadiene, (8) after cooling to 5° C. peroxide catalyst dissolved in the withheld styrene.

The polymerization was carried out for 15 hours at 5° C., at the end of which time the polymerization was stopped by the addition of 0.2 part of potassium dimethyl dithiocarbamate. Excess butadiene was vented off and the percent conversion of monomers to polymer was determined by evaporation of a weighed sample of the latex.

With no sodium formaldehyde sulfoxylate there was no conversion. With the addition of 0.05, 0.1, 0.2 and 0.4 part of sodium formaldehyde sulfoxylate dihydrate ($Na_2OSCH_2OH \cdot 2H_2O$) the conversions were 77%, 98%, 100% and 74%, respectively.

Example II

In polymerizations similar to Example I but using 0.05, 0.1, 0.2 and 0.4 part of sodium formaldehyde sulfoxylate with 5 parts of potassium soap of a commercial mixture of stearic, palmitic and oleic acids as the emulsifier instead of the potassium soap of disproportionated rosin acids the conversions were 100%, 100%, 100% and 79%, respectively.

Example III

Polymerizations were carried out for 8 hours with the recipe of Example I modified by inclusion of 0.1 part of sodium formaldehyde sulfoxylate dihydrate in all cases and various amounts of $FeSO_4 \cdot 7H_2O$ and of $FeCl_3 \cdot 6H_2O$ as the iron salt. Also, the amount of tetrasodium salt of ethylene diamine tetraacetic acid was twice the weight of the ferrous sulfate heptahydrate or ferric chloride hexahydrate.

With 0.01, 0.015 and 0.02 part of $FeSO_4 \cdot 7H_2O$, the conversions were 59%, 81% and 93%, respectively. With 0.01, 0.015 and 0.02 part of $FeCl_3 \cdot 6H_2O$, the conversions were 62%, 88% and 93%, respectively.

Example IV

A mixture of sodium benzaldehyde sulfoxylate and sodium benzaldehyde bisulfite was prepared by reacting benzaldehyde with sodium dithionite as follows:

Eleven grams of benzaldehyde (.104 mol) and about 120 ml. of water were placed in a 200 ml. volumetric flask. Sodium dithionite dihydrate (10.8 grams, .052 mol) was then added and the flask was shaken. Reaction was evident by solution of the benzaldehyde. The solution of sodium benzaldehyde sulfoxylate and sodium benzaldehyde bisulfite was diluted to 200 ml. (5% in sodium benzaldehyde sulfoxylate, 5.4% in sodium benzaldehyde bisulfite). The overall reaction is:

$$Na_2S_2O_4 \cdot 2H_2O + 2C_6H_5CHO \rightarrow NaHSO_2C_6H_5CHO + NaHSO_3C_6H_5CHO + H_2O$$

A mixture of sodium formaldehyde sulfoxylate and sodium formaldehyde bisulfite was similarly prepared by reacting formaldehyde with sodium dithionite.

Aqueous emulsions of synthetic rubber-forming monomers were made up according to the following recipe:

| | Parts by weight |
|---|---|
| Butadiene | 70 |
| Styrene | 30 |
| Sodium soap of disproportionated rosin acid | 4.5 |
| Diisopropylbenzene hydroperoxide | 0.15 |
| $FeCl_3 \cdot 6H_2O$ | 0.01 |
| Tetrasodium salt of ethylenediamine tetraacetic acid | 0.02 |
| Mixed tertiary mercaptans | 0.3 |
| Sodium sulfate (viscosity reducer) | 0.3 |
| Water | 180 |

There was also added to different polymerization vessels a mixture of sodium benzaldehyde sulfoxylate and sodium benzaldehyde bisulfite prepared as above, sodium benzaldehyde bisulfite without the sulfoxylate, a mixture of sodium formaldehyde sulfoxylate and sodium formaldehyde bisulfite, sodium formaldehyde sulfoxylate alone and sodium formaldehyde bisulfite alone. The polymerizations were carried out for thirteen hours at 5° C. with the following results:

| Additive | Percent Conversion |
|---|---|
| 0.1 part of sodium benzaldehyde sulfoxylate + 0.1 part of sodium benzaldehyde bisulfite | 80 |
| 0.1 part of sodium benzaldehyde bisulfite | 0 |
| 0.1 part of sodium formaldehyde sulfoxylate + 0.1 part of sodium formaldehyde bisulfite | 58 |
| 0.1 part of sodium formaldehyde sulfoxylate | 60 |
| 0.1 part of sodium formaldehyde bisulfite | 0 |

Example V

A mixture of sodium acetone sulfoxylate and sodium acetone bisulfite was prepared by reacting acetone with sodium dithionite similarly to the benzaldehyde-dithionite reaction of Example IV.

The following recipe was polymerized for sixteen hours at 5° C.:

|  | Parts by weight |
| --- | --- |
| Butadiene | 70 |
| Styrene | 30 |
| Potassium soap of disproportionated rosin acid | 4 |
| Diisopropylbenzene hydroperoxide | 0.15 |
| FeCl₃·6H₂O | 0.0075 |
| Tetrasodium salt of ethylene diamine tetraacetic acid | 0.015 |
| Sodium acetone sulfoxylate | 0.1 |
| Sodium acetone bisulfite | 0.1 |
| Potassium chloride | 0.2 |
| Water | 180 |

The conversion of monomers to polymer was 55%.

Under the same conditions with the reaction product of formaldehyde and sodium dithionite and with the reaction product of benzaldehyde and sodium dithionite instead of the acetone-dithionite reaction product, the conversions were 62% in each case.

Example VI

The condensation product of sodium formaldehyde sulfoxylate and ethylenediamine was prepared as follows:

A mixture of 3.3 g. (.038 mol) of ethylenediamine and 11.85 g. (.077 mol) of sodium formaldehyde sulfoxylate dihydrate was fused on the steam bath until the melt solidified. The product was cooled and dissolved in water.

The following recipe was polymerized for seventeen hours at 5° C.:

|  | Parts by weight |
| --- | --- |
| Butadiene | 70 |
| Styrene | 30 |
| Potassium soap of disproportionated rosin acid | 4 |
| Diisoppropylbenzene hydroperoxide | 0.1 |
| FeCl₃·6H₂O | 0.0075 |
| Tetrasodium salt of ethylene diamine tetraacetic acid | 0.015 |
| Reaction product of 2 mols of sodium formaldehyde sulfoxylate and 1 mol of ethylenediamine, i. e. (—CH₂NHCH₂SO₂Na)₂ | 0.2 |
| Mixed tertiary mercaptans | 0.3 |
| Potassium chloride | 0.3 |
| Water | 180 |

The conversion of monomers to polymer was 83%.

Example VII

The condensation product of sodium formaldehyde sulfoxylate and sodium sulfanilate was prepared as follows:

Sulfanilic acid (8.6 g., .05 mol) suspended in 50 ml. of methanol was neutralized with 20% NaOH to a pH of about 10. The mixture was heated to boiling, dissolving all but a trace of the salt. NaOH was added as needed to maintain the pH at 10. To the boiling solution was added 7.7 g. (.05 mol) of sodium formaldehyde sulfoxylate dihydrate (.05 mol). The sulfoxylate went into solution rapidly. The mixture was heated, stirred on the steam bath for 90 minutes, during which time a heavy white precipitate formed. The solid was dissolved by the addition of 75 ml. of water. The solution was filtered and diluted to a concentration of 10%.

The following recipe was polymerized for thirteen hours at 5° C.:

|  | Parts by weight |
| --- | --- |
| Butadiene | 70 |
| Styrene | 30 |
| Potassium soap of disproportionated rosin acid | 5 |
| FeSO₄·7H₂O | 0.01 |
| Tetra sodium salt of ethylenediamine tetraacetic acid | 0.02 |
| Reaction product of 1 mol of sodium formaldehyde sulfoxylate and 1 mol of sodium sulfanilate, i. e., Na₃SC₆H₄NHCH₂SO₂Na | 0.2 |
| Potassium chloride | 0.3 |
| Mixed tertiary mercaptans | 0.3 |
| Water | 180 |

The conversion of monomers to polymer was 75%.

Example VIII

The following recipe using different peroxide catalysts was polymerized for 15.5 hours at 5° C.:

|  | Parts by weight |
| --- | --- |
| Butadiene | 70 |
| Styrene | 30 |
| Potassium soap of disproportionated rosin acid | 4.5 |
| Peroxide catalyst | 0.15 |
| FeCl₃·6H₂O | 0.0075 |
| Tetra sodium salt of ethylene diamine tetraacetic acid | 0.015 |
| Sodium formaldehyde sulfoxylate | 0.1 |
| Potassium chloride | 0.3 |
| Mixed tertiary mercaptans | 0.3 |
| Water | 180 |

The conversion with diisopropyl benzene hydroperoxide was 82%, with t-butylisopropylbenzene hydroperoxide—94%, with phenylcyclohexyl hydroperoxide—98%, with cumene hydroperoxide—50%, and with para-menthane hydroperoxide—90%.

Example IX

Various rubber-forming monomers were polymerized for fourteen hours at 5° C. according to the following recipe:

|  | Parts by weight |
| --- | --- |
| Polymerizable monomers | 100 |
| Potassium soap of disproportionated rosin acid | 4.5 |
| Diisopropyl benzene hydroperoxide | 0.1 |
| FeSO₄·7H₂O | 0.01 |
| Tetra sodium salt of ethylenediamine tetraacetic acid | 0.02 |
| Sodium formaldehyde sulfoxylate | 0.10 |
| Potassium chloride | 0.3 |
| Mixed tertiary mercaptans | 0.25 |
| Water | 180 |

With 100 parts butadine as the polymerizable monomer, the conversion was 70%; with 50 parts of isoprene and 50 parts of butadiene as the polymerizable monomers, the conversion was 61%; with 70 parts butadiene and 30 parts of methyl acrylate as the polymerizable monomers, the conversion was 74%.

In view of the many changes and modifications that may be made without departing from the principles underlying the invention, reference should be made to the appended claims for an understanding of the scope of the protection afforded the invention.

Having thus described my invention, what I claim and desire to protect by Letters Patent is:

1. In the process of polymerizing an aqueous emulsion of polymerizable synthetic rubber-forming monomers selected from the group consisting of butadienes-1,3 and mixtures of butadienes-1,3 with compounds which contain a single $CH_2=C<$ group and are copolymerizable with butadienes-1,3, and containing an organic peroxide catalyst, an iron salt, and an alkali salt of ethylenediamine tetraacetic acid, the step of carrying out said polymerization in the presence of 0.0002 to 0.02 gram equivalent of a sulfoxylate selected from the group consisting of ketone sulfoxylates and aldehyde sulfoxylates per 100 grams of said polymerizable monomers.

2. The process of polymerizing in aqueous emulsion a mixture of butadienes-1,3 and styrene containing an organic peroxide catalyst, an iron salt, and an alkali salt of ethylenediamine tetraacetic acid, the step of carrying out said polymerization in the presence of 0.0002 to 0.02 gram equivalent of a sulfoxylate selected from the group consisting of ketone sulfoxylates and aldehyde sulfoxylates per 100 grams of said polymerizable monomers.

3. In the process of polymerizing an aqueous emulsion of polymerizable synthetic rubber-forming monomers selected from the group consisting of butadienes-1,3 and mixtures of butadienes-1,3 with compounds which contain a single $CH_2=C<$ group and are copolymerizable with butadienes-1,3 and containing an organic peroxide catalyst, an iron salt, and an alkali salt of ethylenediamine tetraacetic acid, the step of carrying out said polymerization in the presence of 0.02 to 2 parts of sodium formaldehyde sulfoxylate per 100 parts of polymerizable monomers.

4. In the process of polymerizing an aqueous emulsion of polymerizable synthetic rubber-forming monomers selected from the group consisting of butadienes-1,3 and mixtures of butadienes-1,3 with compounds which contain a single $CH_2=C<$ group and are copolymerizable with butadienes-1,3, and containing an organic peroxide catalyst, ferrous sulfate, and an alkali salt of ethylenediamine tetraacetic acid, the step of carrying out said polymerization in the presence of 0.02 to 2 parts of sodium formaldehyde sulfoxylate per 100 parts of polymerizable monomers.

5. In the process of polymerizing an aqueous emulsion of polymerizable synthetic rubber-forming monomers selected from the group consisting of butadienes-1,3 and mixtures of butadienes-1,3 with compounds which contain a single $CH_2=C<$ group and are copolymerizable with butadienes-1,3, and containing an organic peroxide catalyst, ferric chloride, and an alkali salt of ethylenediamine tetraacetic acid, the step of carrying out said polymerization in the presence of 0.02 to 2 parts of sodium formaldehyde sulfoxylate per 100 parts of polymerizable monomers.

6. In the process of polymerizing in aqueous emulsion a mixture of butadiene-1,3 and styrene containing an organic peroxide catalyst, an iron salt, and an alkali salt of ethylenediamine tetraacetic acid, the step of carrying out said polymerization in the presence of 0.02 to 2 parts of sodium formaldehyde sulfoxylate per 100 parts of polymerizable monomers.

7. In the process of polymerizing in aqueous emulsion a mixture of butadiene-1,3 and styrene containing an organic peroxide catalyst, ferrous sulfate, and an alkali salt of ethylenediamine tetraacetic acid, the step of carrying out said polymerization in the presence of 0.02 to 2 parts of sodium formaldehyde sulfoxylate per 100 parts of polymerizable monomers.

8. In the process of polymerizing in aqueous emulsion a mixture of butadiene-1,3 and styrene containing an organic peroxide catalyst, ferric chloride, and an alkali salt of ethylenediamine tetraacetic acid, the step of carrying out said polymerization in the presence of 0.02 to 2 parts parts of sodium formaldehyde sulfoxylate per 100 parts of polymerizable monomers.

9. The process which comprises polymerizing an aqueous emulsion of polymerizable synthetic rubber-forming monomers selected from the group consisting of butadienes-1,3 and mixtures of butadienes-1,3 with compounds which contain a single $CH_2=C<$ group and are copolymerizable with butadienes-1,3, in the presence of 0.02 to 2 parts of organic peroxide catalyst and 0.0002 to 0.02 part of iron in the form of a water-soluble iron salt and 0.001 to 0.5 part of alkali salt of ethylenediamine tetraacetic acid per 100 parts of polymerizable monomers, and 0.0002 to 0.02 gram equivalent of a sulfoxylate selected from the group consisting of ketone sulfoxylates and aldehyde sulfoxylates per 100 grams of polymerizable monomers.

10. The process which comprises polymerizing in aqueous emulsion a mixture of butadiene-1,3 and styrene in the presence of 0.02 to 2 parts of organic peroxide catalyst and 0.0002 to 0.02 part of iron in the form of a water-soluble salt and 0.001 to 0.5 part of alkali salt of ethylenediamine tetraacetic acid per 100 parts of polymerizable monomers, and 0.0002 to 0.02 gram equivalent of a sulfoxylate selected from the group consisting of ketone sulfoxylates and aldehyde sulfoxylates per 100 grams of polymerizable monomers.

11. The process which comprises polymerizing an aqueous emulsion of polymerizable synthetic rubber-forming monomers selected from the group consisting of butadienes-1,3 and mixtures of butadienes-1,3 with compounds which contain a single $CH_2=C<$ group and are copolymerizable with butadienes-1,3, in the presence of 0.02 to 2 parts of organic peroxide catalyst, 0.0002 to 0.02 part of iron in the form of a water-soluble iron salt, 0.001 to 0.5 part of an alkali salt of ethylenediamine tetraacetic acid, and 0.02 to 2 parts of sodium formaldehyde sulfoxylate per 100 parts of polymerizable monomers.

12. The process which comprises polymerizing an aqueous emulsion of polymerizable synthetic rubber-forming monomers selected from the group consisting of butadienes-1,3 and mixtures of butadienes-1,3 with compounds which contain a single $CH_2=C<$ group and are copolymerizable with butadienes-1,3, in the presence of 0.02 to 2 parts of organic peroxide catalyst, 0.0006 to 0.06 part of ferrous sulfate, 0.001 to 0.5 part of an alkali salt of ethylenediamine tetraacetic acid, and 0.02 to 2 parts of sodium formaldehyde sulfoxylate per 100 parts of polymerizable monomers.

13. The process which comprises polymerizing an aqueous emulsion of polymerizable synthetic rubber-forming monomers selected from the group consisting of butadienes-1,3 and mixtures of butadienes-1,3 with compounds which contain a single $CH_2=C<$ group and are copolymerizable with butadienes-1,3, in the presence of 0.02 to 2 parts of organic peroxide catalyst, 0.0006 to 0.06 part of ferric chloride, 0.001 to 0.5 part of an alkali salt of ethylenediamine tetraacetic acid, and 0.02 to 2 parts of sodium formaldehyde sulfoxylate per 100 parts of polymerizable monomers.

14. The process which comprises polymerizing in aqueous emulsion a mixture of butadiene-1,3 and styrene in the presence of 0.02 to 2 parts of organic peroxide catalyst, 0.0002 to 0.02 part of iron in the form of a water-soluble iron salt, 0.001 to 0.5 part of an alkali salt of ethylenediamine tetraacetic acid, and 0.02 to 2 parts of sodium formaldehyde sulfoxylate per 100 parts of polymerizable monomers.

15. The process which comprises polymerizing in aqueous emulsion a mixture of butadiene-1,3 and styrene in the presence of 0.02 to 2 parts of organic peroxide catalyst, 0.0006 to 0.06 part of ferrous sulfate, 0.001 to 0.5 part of an alkali salt of ethylenediamine tetraacetic acid, and 0.02 to 2 parts of sodium formaldehyde sulfoxylate per 100 parts of polymerizable monomers.

16. The process which comprises polymerizing in aqueous emulsion a mixture of butadiene-1,3 and styrene in the presence of 0.02 to 2 parts of organic peroxide catalyst, 0.0006 to 0.06 part of ferric chloride, 0.001 to 0.5 part of an alkali salt of ethylenediamine tetraacetic acid, and 0.02 to 2 parts of sodium formaldehyde sulfoxylate per 100 parts of polymerizable monomers.

References Cited in the file of this patent

UNITED STATES PATENTS

| | | |
|---|---|---|
| 2,383,055 | Fryling | Aug. 21, 1945 |
| 2,631,142 | Williams et al. | Mar. 10, 1953 |
| 2,631,997 | Stewart | Mar. 17, 1953 |